United States Patent
Bonneville

(10) Patent No.: US 10,954,014 B2
(45) Date of Patent: Mar. 23, 2021

(54) LIFTING ASSEMBLIES FOR ASSISTING MOVEMENT OF DIE BOXES ON WEB PACKAGING MACHINES

(71) Applicant: Alkar-RapidPak, Inc., Lodi, WI (US)

(72) Inventor: Craig R. Bonneville, Black Earth, WI (US)

(73) Assignee: Alkar-RapidPak, Inc., Lodi, WI (US)

( * ) Notice: Subject to any disclaimer, the term of this patent is extended or adjusted under 35 U.S.C. 154(b) by 250 days.

(21) Appl. No.: 15/608,643

(22) Filed: May 30, 2017

(65) Prior Publication Data

US 2017/0355479 A1 Dec. 14, 2017

Related U.S. Application Data

(60) Provisional application No. 62/347,791, filed on Jun. 9, 2016.

(51) Int. Cl.
*B65B 41/12* (2006.01)
*B65B 61/04* (2006.01)
(Continued)

(52) U.S. Cl.
CPC ............ *B65B 41/12* (2013.01); *B29C 31/006* (2013.01); *B29C 51/26* (2013.01); *B29C 51/30* (2013.01);
(Continued)

(58) Field of Classification Search
CPC ....... B65B 41/12; B65B 59/04; B65B 7/2878; B65B 47/02; B65B 9/04; B65B 61/04;
(Continued)

(56) References Cited

U.S. PATENT DOCUMENTS

| | | |
|---|---|---|
| 2,194,883 A | 3/1940 | Burton |
| 2,700,790 A | 2/1955 | Johnson |
| | (Continued) | |

FOREIGN PATENT DOCUMENTS

| | | |
|---|---|---|
| DE | 9017161 | 2/1992 |
| DE | 10201009536 | 9/2011 |
| | (Continued) | |

OTHER PUBLICATIONS

Bonneville, "Clamping Devices for Clamping Die Members onto Web Packaging Machines", Unpublished U.S. Appl. No. 15/498,088, filed Apr. 26, 2017.

(Continued)

*Primary Examiner* — Nathaniel C Chukwurah
*Assistant Examiner* — Mobeen Ahmed
(74) *Attorney, Agent, or Firm* — Andrus Intellectual Property Law, LLP

(57) ABSTRACT

A web packaging machine for forming a food product package from a lower web of packaging material and an upper web of packaging material includes a frame, a web transport conveyor extending along the frame and configured to transport the lower web of packaging material along the frame, and a die box pivotally coupled to the frame and configured to form or close the food product package. A lift assembly is pivotally coupled to the frame and configured to assist manual pivoting of the die box relative to the frame.

17 Claims, 6 Drawing Sheets

(51) Int. Cl.
*B29C 51/26* (2006.01)
*B65B 59/04* (2006.01)
*B29C 31/00* (2006.01)
*B29C 51/30* (2006.01)
*B65B 47/06* (2006.01)
*B29C 65/00* (2006.01)
*B65B 7/28* (2006.01)
*B65B 47/02* (2006.01)
*B65B 9/04* (2006.01)
*B65B 47/10* (2006.01)
*B65B 11/50* (2006.01)
*B65B 11/52* (2006.01)
*B65B 7/16* (2006.01)

(52) U.S. Cl.
CPC .............. *B65B 47/06* (2013.01); *B65B 59/04* (2013.01); *B29C 66/112* (2013.01); *B29C 66/131* (2013.01); *B29C 66/53461* (2013.01); *B29C 66/8167* (2013.01); *B29C 66/849* (2013.01); *B29C 66/8432* (2013.01); *B29C 66/8762* (2013.01); *B65B 7/162* (2013.01); *B65B 7/164* (2013.01); *B65B 7/2878* (2013.01); *B65B 9/04* (2013.01); *B65B 11/50* (2013.01); *B65B 11/52* (2013.01); *B65B 47/02* (2013.01); *B65B 47/10* (2013.01); *B65B 61/04* (2013.01)

(58) Field of Classification Search
CPC ........ B65B 7/162; B65B 7/164; B65B 11/50; B65B 11/52; B65B 47/06; B65B 47/10; B29C 51/30; B29C 51/26; B29C 31/006; B29C 66/8762; B29C 66/849; B29C 66/8167; B29C 66/53461; B29C 66/131; B29C 66/112; B29C 66/8432
USPC ............ 425/181–196; 53/285, 329, 559, 561
See application file for complete search history.

(56) References Cited

U.S. PATENT DOCUMENTS

| | | | | |
|---|---|---|---|---|
| 2,751,287 | A | | 6/1956 | Gordon |
| 3,438,834 | A | * | 4/1969 | Johnston ............... B65B 51/148 156/515 |
| 3,693,318 | A | * | 9/1972 | Balzer .................... B65B 7/164 53/329.3 |
| 4,490,961 | A | * | 1/1985 | Raque ................. B29C 66/8432 53/329.4 |
| 4,578,928 | A | * | 4/1986 | Andre ................... B65B 31/022 53/373.4 |
| 4,656,816 | A | * | 4/1987 | Watts, Jr. ................ B65B 11/52 53/427 |
| 4,920,726 | A | * | 5/1990 | Yamada .................. B65B 31/08 53/133.1 |
| 5,205,110 | A | | 4/1993 | Buchko |
| 5,465,557 | A | * | 11/1995 | Harte ...................... B65B 31/02 16/289 |
| 5,489,132 | A | | 2/1996 | Schneider |
| 5,732,844 | A | | 3/1998 | Zorzini |
| 5,822,956 | A | * | 10/1998 | Liechti .................... B65B 7/164 53/510 |
| 6,681,546 | B2 | * | 1/2004 | DeYoung .............. B65B 7/2878 53/329.2 |
| 7,490,448 | B1 | | 2/2009 | Bonneville |
| 8,186,134 | B2 | | 5/2012 | Shackelford et al. |
| 8,499,536 | B2 | | 8/2013 | Bonneville |
| 9,248,929 | B2 | | 2/2016 | Ehrmann |
| 9,555,513 | B2 | | 1/2017 | Schmeiser |
| 9,944,057 | B1 | | 4/2018 | Shaw |
| 2006/0027286 | A1 | | 2/2006 | Resterhouse |
| 2009/0100804 | A1 | * | 4/2009 | Bonneville ............. B65B 47/02 53/453 |
| 2009/0241469 | A1 | * | 10/2009 | Moessnang ........... B65B 31/024 53/209 |
| 2011/0247303 | A1 | * | 10/2011 | Haring .................... B65B 65/00 53/396 |
| 2013/0167489 | A1 | * | 7/2013 | Brizzi ..................... B65B 13/04 53/582 |
| 2013/0212988 | A1 | * | 8/2013 | Schmeiser .............. B65B 7/164 53/558 |
| 2014/0265016 | A1 | | 9/2014 | Nguyen et al. |
| 2015/0052848 | A1 | * | 2/2015 | Vine ........................ B62B 3/08 53/329 |

FOREIGN PATENT DOCUMENTS

| | | |
|---|---|---|
| EP | 2384980 | 11/2011 |
| EP | 2746168 | 6/2014 |
| WO | 2016/069777 | 5/2016 |

OTHER PUBLICATIONS

EP Extended Search Report, EP Patent Application No. 17174748.8, dated Nov. 8, 2017.

* cited by examiner

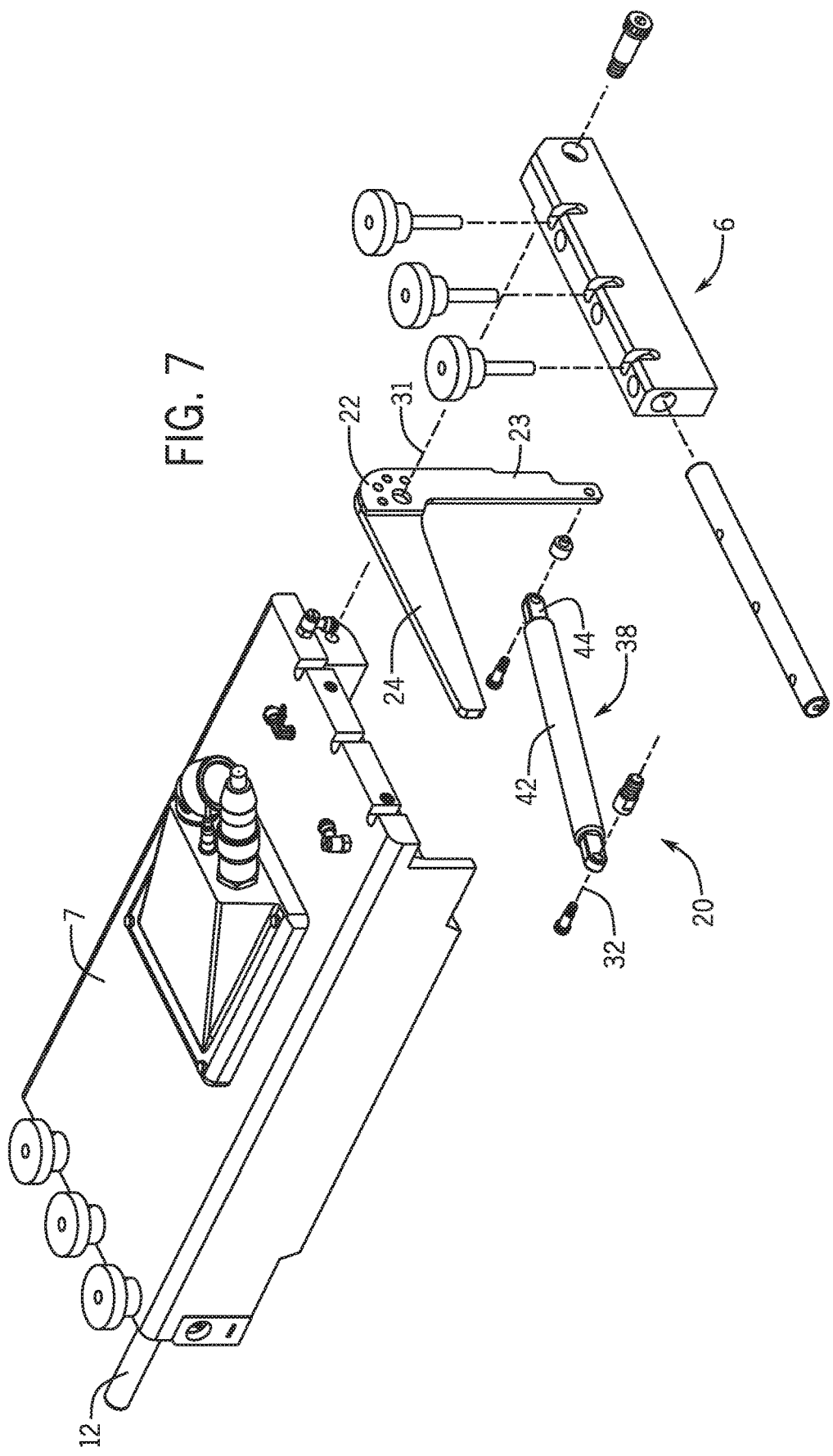

LIFTING ASSEMBLIES FOR ASSISTING MOVEMENT OF DIE BOXES ON WEB PACKAGING MACHINES

CROSS-REFERENCE TO RELATED APPLICATION

The present application is based on and claims priority to U.S. Provisional Patent Application Ser. No. 62/347,791 filed Jun. 9, 2016, the disclosure of which is incorporated herein by reference.

FIELD

The present disclosure relates to lifting assemblies for assisting movement of die boxes on web packaging machines.

BACKGROUND

The following U.S. Patents and U.S. Patent Application Publication are incorporated herein by reference in entirety.

U.S. Pat. No. 5,205,110 discloses an indexing motion apparatus and method for vacuum packaging of articles such as hot dogs, sliced luncheon meat, cheese or pharmaceuticals. A lower web of packaging material is indexingly advanced by a lower web drive driven in an indexing manner by a servo motor. Forming tooling is provided for vacuum forming the lower web to form one or more product cavities and the forming tooling is movable between raised and lowered positions by a lifting and lowering system driven by a servo motor. After the formed product cavities are loaded with product, the cavities are evacuated and an upper web applied to vacuum package the product. A slitting mechanism severs the upper and lower webs into individual product packages. The servo motors are programmable and provide accurate position of the components of the packaging machine, and also provide ease in changing the various parameters of the packaging machine according to the type of product being packaged.

U.S. Pat. No. 8,186,134 discloses packaging machines that include a web transport conveyor for transporting a web of flexible packaging material from upstream to downstream locations through a series of stations and packaging apparatuses. A forming station and a closing station each have movable die members that are counterbalanced.

U.S. Pat. No. 8,499,536 discloses packaging machines that include a web transport conveyor transporting a web of flexible packaging material from upstream to downstream locations through a series of stations.

U.S. Patent Application Publication No. 2017/0313457 discloses clamping devices for clamping and securing die members onto web packaging machines.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples disclosed herein, a lifting assembly is for assisting movement of a die box on a web packaging machine. The web packaging machine is for forming a food product package from a lower web of packaging material and an upper web of packaging material, and the web packaging machine includes a frame, a web transport conveyor extending along the frame for transporting the lower web of packaging material along the frame, and a die box pivotally connected to the frame for forming or closing the food product package. A lift assembly is pivotally connected to the frame to assist manual pivoting of the die box relative to the frame.

Various other features, objects, and advantages will be made apparent from the following description taken together with the drawings.

BRIEF DESCRIPTION OF THE DRAWINGS

The present disclosure includes the following Figures. The same numbers are used throughout the Figures to reference like features and like components.

FIG. 7 is an exploded view of the die box, a portion of a frame, and a lift assembly.

DETAILED DESCRIPTION OF THE DRAWINGS

In the present description, certain terms have been used for brevity, clarity and understanding. No unnecessary limitations are to be inferred therefrom beyond the requirement of the prior art because such terms are used for descriptive purposes only and are intended to be broadly construed. The different devices described herein may be used alone or in combination with other devices. Various equivalents, alternatives and modifications are possible within the scope of the appended claims.

Figure 1:
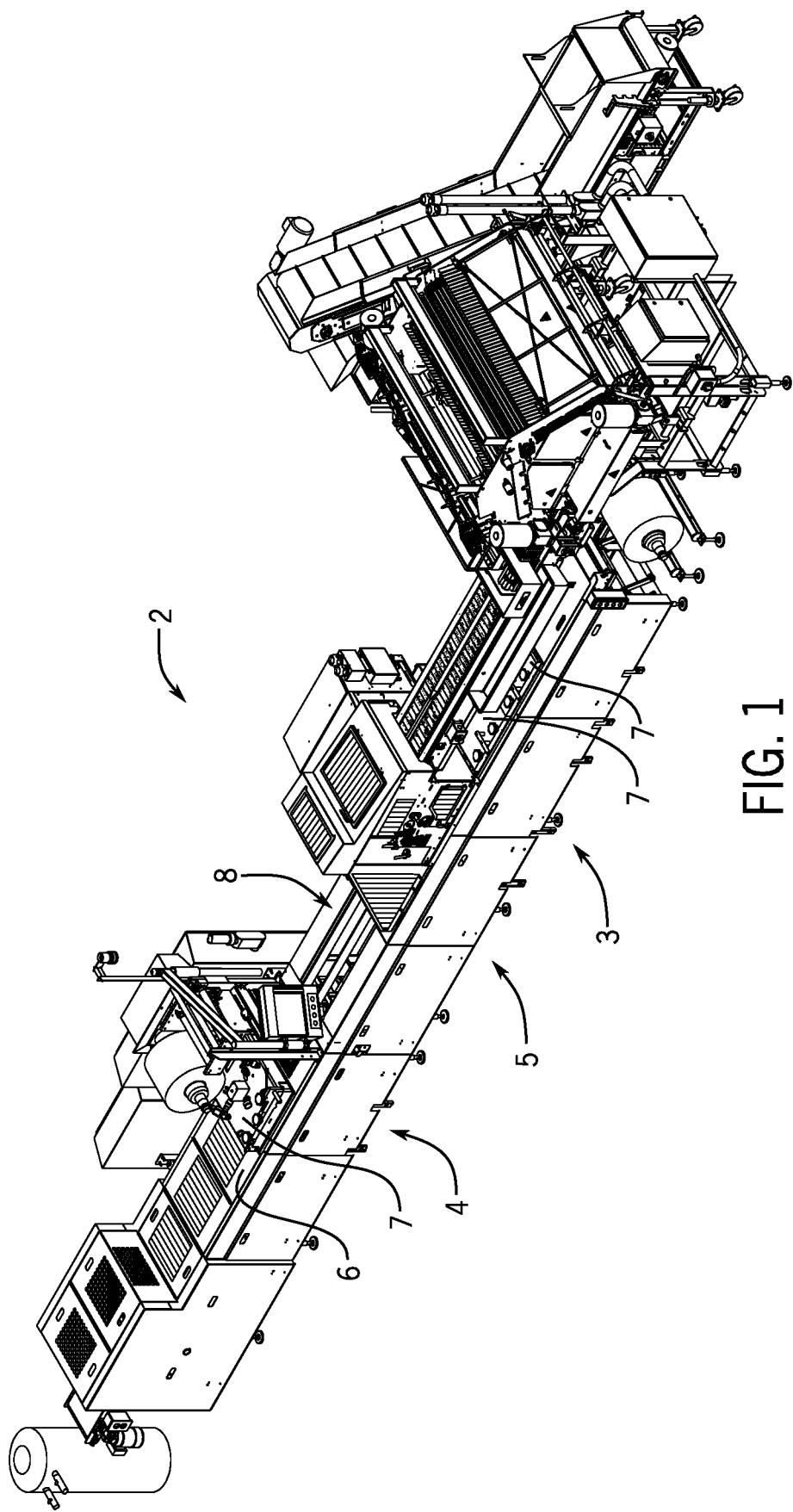
FIG. 1 is an example of a web packaging machine.

FIG. 1 depicts an example web packaging machine 2, such as is disclosed in the above-incorporated U.S. Patents. As disclosed in those patents, the web packaging machine 2 is configured to form a food product package from lower and upper webs of flexible packaging material. A web transport conveyor 8 (FIGS. 4-6) is configured to transport a lower web of packaging material from upstream to downstream through a series of stations that are supported by a frame 6 of the web packaging machine 2. A forming station 3 forms a food product cavity in the lower web. A filling station 5 fills the food product cavity with food product. A closing or sealing station 4 encloses the food product in the food product cavity by sealing the upper web to the lower web, thereby forming the food product package. Optionally, a cutting station cuts the upper and lower webs into separate food product packages.

Figure 2:
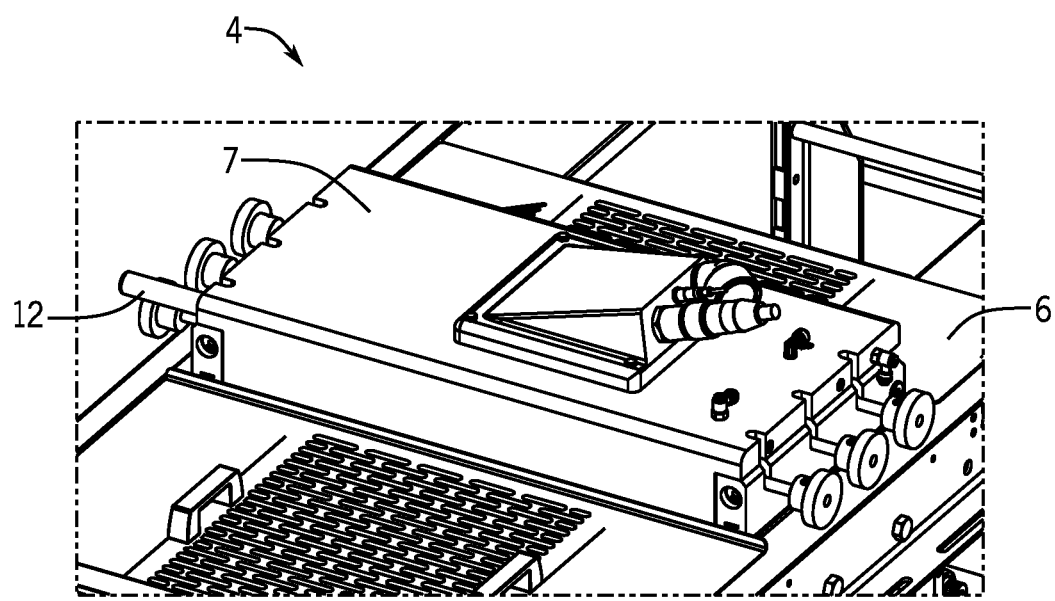
FIG. 2 is a partial perspective view at a sealing station of the web packaging machine shown in FIG. 1. The sealing station has a die box that is in a lowered position.

It is known to equip the web packaging machine 2 with one or more die members or boxes 7 at the sealing station 4 to seal the upper web to the lower web. One example of an arrangement in which a die box is positioned at the sealing station is disclosed in U.S. Pat. No. 8,186,134. At the sealing station 4 (FIG. 2-3), a heat sealing mechanism 14 (FIG. 3) of the die box 7 contacts the upper web (not shown) to heat seal the upper web to the lower web. Over time, repeated sealing of the upper web to the lower web causes plastic compounds from the upper web to accumulate on the heat seal mechanism 14 and/or the die box 7. Accordingly, it is often necessary for operators to inspect the die box 7 and/or remove plastic compounds from the heat seal mechanism 14 and/or die box 7 to ensure that the sealing station 4 continues to efficiently and effectively operate.

Figure 3:
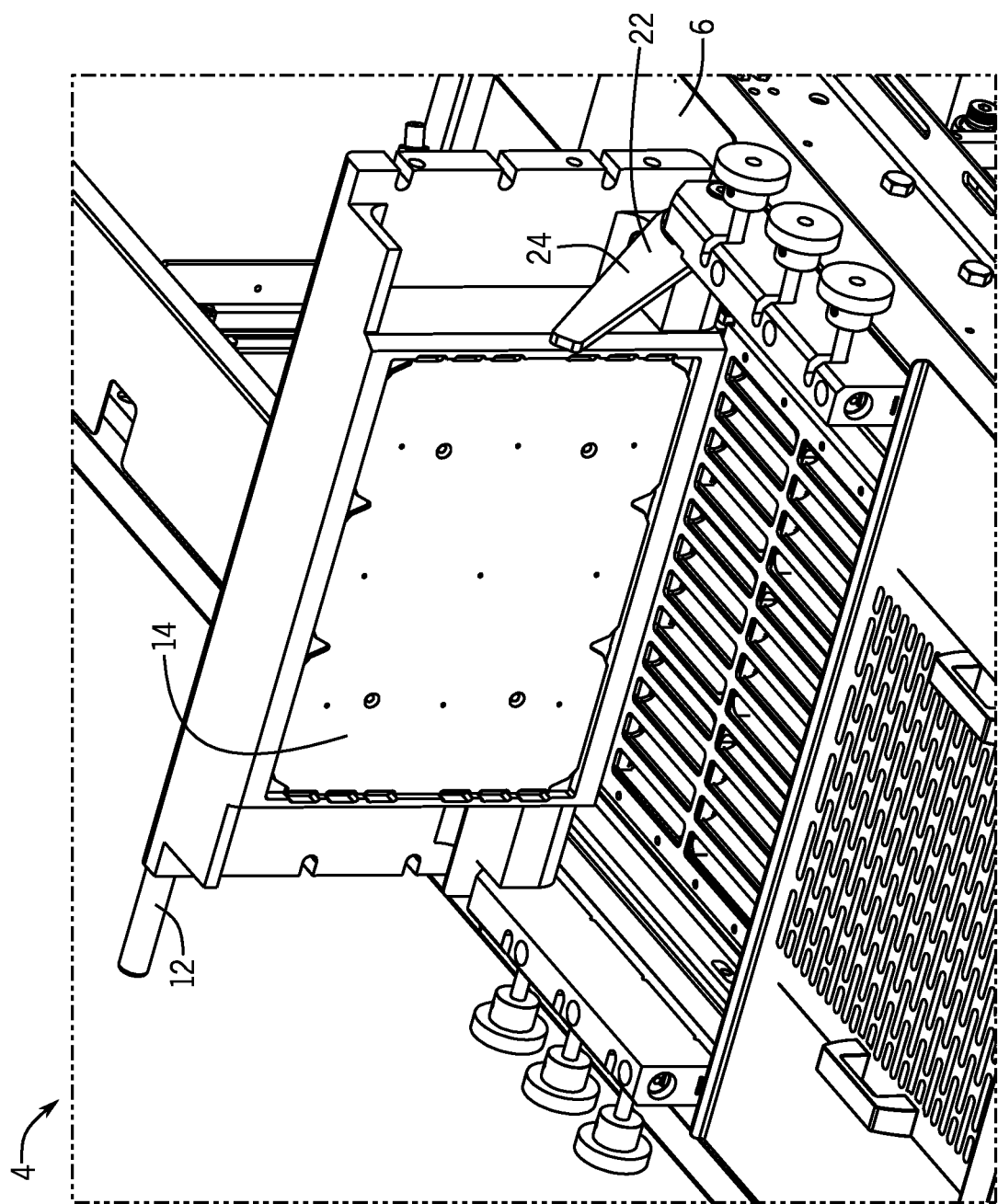
FIG. 3 is a partial perspective view at the sealing station of the web packaging machine like FIG. 2 with the die box in a raised position in which the bottom surface of the die box and a heat sealing mechanism are exposed and accessible.

In order to inspect the die box 7 and/or remove any buildup of plastic compounds on the heat seal mechanism 14 and/or die box 7, the operator must manually move or pivot the die box 7 from its operational or lowered position (FIG. 2) to a maintenance or raised position (FIG. 3). However, manually moving or pivoting the die box 7 may be difficult as the die box 7 is often heavy and unwieldy. Upon recognition of these problems, the present inventor has endeavored, through research and experimentation, to develop lift assemblies 20 for assisting manual movement of the die boxes 7 for inspection and maintenance.

Figure 4:
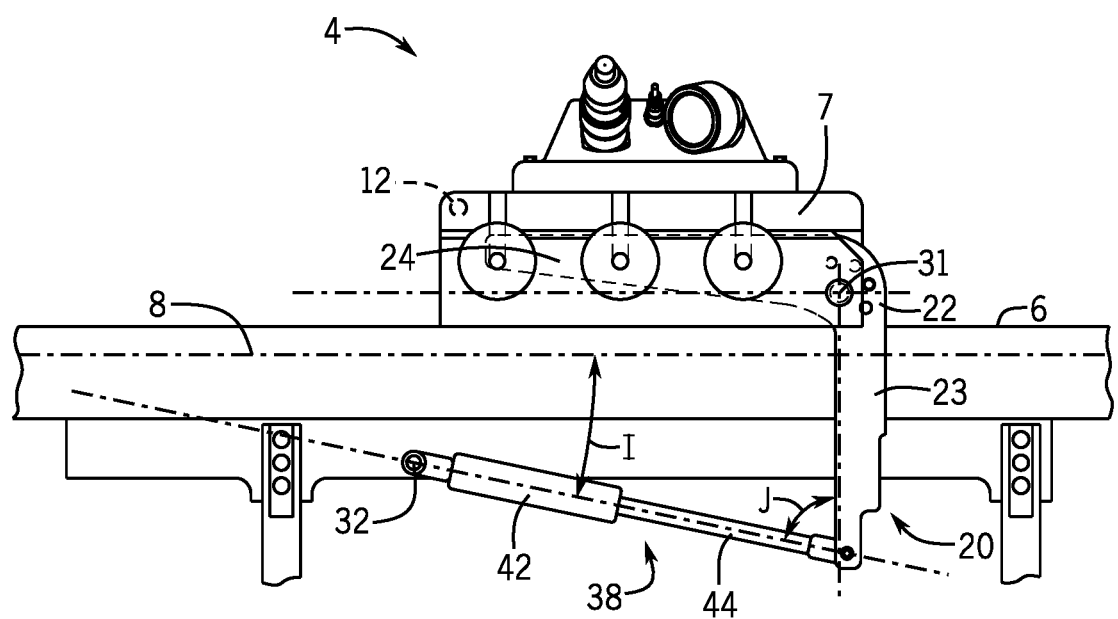
FIG. 4 is a side view at the sealing station of the web packaging machine shown in FIG. 1 with the die box in the lowered position.

FIGS. 4-7 depict an example lift assembly 20 which is configured to assist manual pivoting of the die box 7 relative to the frame 6. The lift assembly 20 has a bracket 22 that is pivotally connected to the frame 6 at a first pivot axis 31 about which the bracket 22 and die box 7 pivot. The bracket 22 has a first leg 23 that is connected to a lift device 38 (described further herein) and an opposite, second leg 24 that supports the die box 7 as it is moved into and out of the lowered position (FIG. 4). The bracket 22 is "L" shaped.

The lift assembly 20 includes the lift device 38 which is for actuating the lift assembly 20. The lift device 38 has a cylinder 42 that is pivotally connected to the frame 6 at a second pivot axis 32 which is offset from the first pivot axis 31 and a piston rod 44 that is connected to the first leg 23 of the bracket 22. The piston rod 44 reciprocates in the cylinder 38 as the die box 7 is moved (described further herein), and in particular, the piston rod 44 reciprocates in the cylinder 42 into and between a retracted position (FIGS. 5-6) in which the piston rod 44 is retracted into the cylinder 42 and an extended position (FIG. 4) in which the piston rod 44 is extended from the cylinder 42. The piston rod 44 is biased toward the retracted position (FIGS. 5-6) by a pressurized gas contained in the cylinder 42. One having ordinary skill in the art will recognize that the piston rod 44 can be biased toward the retracted position (FIGS. 5-6) by any suitable means. The type of lift device 38 can vary (e.g. a gas tension spring, a gas spring, an air cylinder, a mechanical spring), and in one non-limiting example, the lift device 38 is a tension gas spring commercially available from Ameritool (part no. 1100).

In use, the operator manually pivots the die box 7 into and between the lowered position (FIG. 4) and the raised position (FIG. 6) by grasping and applying a lifting or closing force to a handle 12 which is attached to the die box 7. As the operator pivots the die box 7, the lift assembly 20 assists manual pivoting of the die box 7 by applying forces on the die box 7. The forces applied by the lift assembly 20 on the die box 7 lessen the manual forces the operator must exert on the handle 12 to manually pivot the die box 7 (i.e. the lift assembly 20 makes it easier to manually pivot the die box 7).

Figure 5:
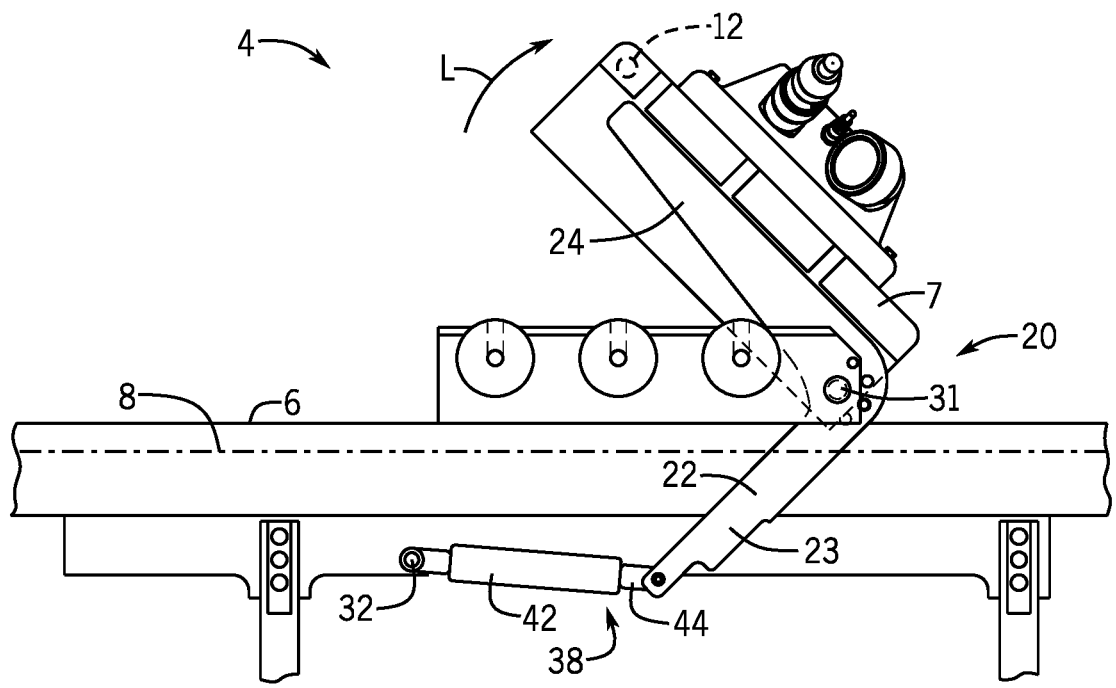
FIG. 5 is a side view at the sealing station of the web packaging machine shown in FIG. 1 with the die box in an intermediate position.
Figure 6:
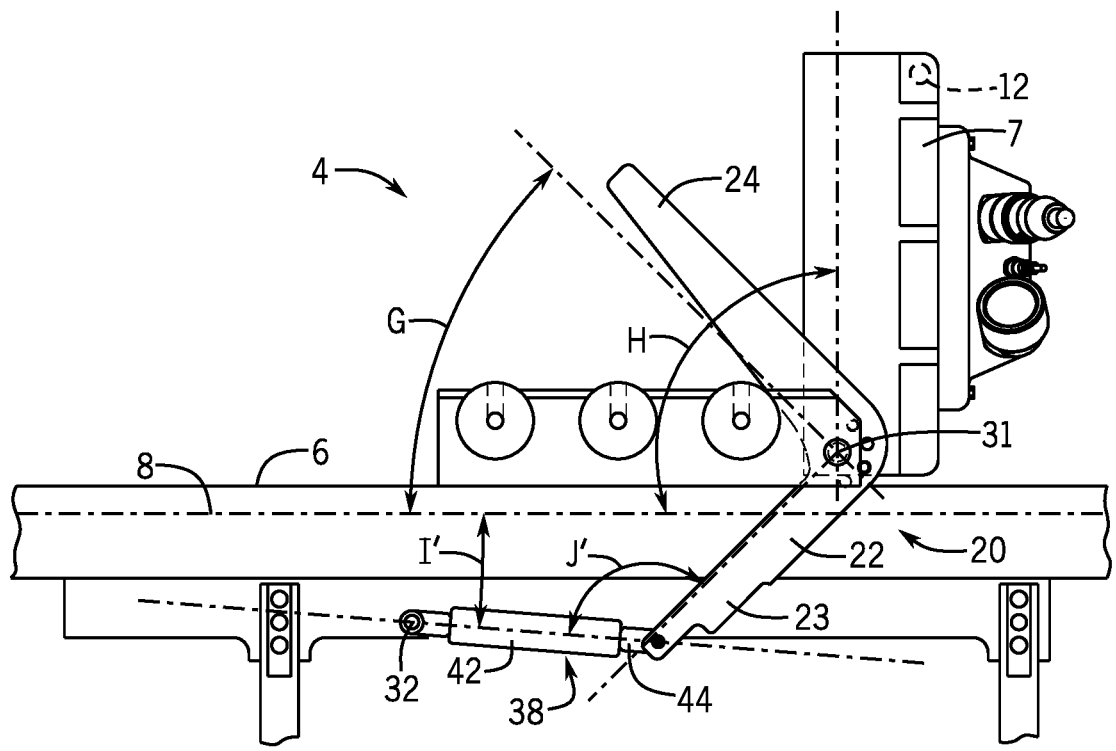
FIG. 6 is a side view at the sealing station of the web packaging machine shown in FIG. 1 with the die box in a raised position.

In the lowered position (FIG. 4), the die box 7 is disposed along the frame 6 and extends parallel to the web transport conveyor 8. As the operator manually pivots the die box 7 away from the lowered position (FIG. 4), the lift device 38 actuates the lift assembly 20 and the lift assembly 20 thereby assists manual pivoting of the die box 7 by applying a lifting force on the die box 7 in a first direction L (FIG. 5) away from the lowered position (FIG. 4). In particular, as the operator manually pivots the die box 7 away from the lowered position (FIG. 4) the piston rod 44 moves from the extended position (FIG. 4) toward the retracted position (FIGS. 5-6) such that the piston rod 44 acts on, i.e. pulls, the first leg 23 of the bracket 22 to thereby pivot the bracket 22 and apply the lifting force via the second leg 24 on the die box 7. The lifting force is relayed by the bracket 22 to the second leg 24 which applies the lifting force to the die box 7 and supports the die box 7 until the piston rod 44 reaches the retracted position (FIG. 5) and the die box 7 reaches an intermediate position (FIG. 5) between the raised position (FIG. 4) and the lowered position (FIG. 6).

As the operator continues to manually pivot the die box 7 from the intermediate position (FIG. 5) toward the raised position (FIG. 6), the die box 7 moves away from, i.e. separates from, the second leg 24. That is, as the die box 7 continues to pivot away from the lowered position (FIG. 4) between the intermediate position (FIG. 5) and the raised position (FIG. 6) the second leg 24 does not pivot with (or support) the die box 7. As such, the lift assembly 20 does not apply the lifting force to the die box 7 as the die box 7 is pivoted between the intermediate position (FIG. 5) and the raised position (FIG. 6). The die box 7 remains in the raised position (FIG. 6) until the operator applies a closing force to the handle 12. In certain examples, the die box 7 includes a lock or latch (not shown) that prevents unintentional movement of the die box 7 away from the raised position (FIG. 6) toward the lowered position (FIG. 4).

While in the raised position (FIG. 6), the die box 7 is transverse to the web transport conveyor 8. The operator can pivot the die box 7 from the raised position (FIG. 6) to the lowered position (FIG. 4) by applying a closing force to the handle 12. As the die box 7 is pivoted away from the raised position (FIG. 6) to the lowered position (FIG. 4), the weight of the die box 7 causes the die box 7 to pivot toward the lowered position (FIG. 4). Furthermore, as the die box 7 is pivoted between the raised position (FIG. 6) and the intermediate position (FIG. 5), the die box 7 is unsupported by the lift assembly 20 and pivots freely toward the lowered position (FIG. 4). When the die box 7 pivots to the intermediate position (FIG. 5), the second leg 24 contacts and supports the die box 7. As the die box 7 continues to pivot toward the lowered position (FIG. 4) from the intermediate position (FIG. 5), the lift assembly 20 applies a dampening force in the first direction L (FIG. 5) to thereby dampen or slow the movement of the die box 7. The dampening force is applied via the second leg 24 to the die box 7 as the die box 7 pivots between the intermediate position (FIG. 5) and the lowered position (FIG. 4).

In particular, as the die box 7 pivots toward the lowered position (FIG. 4) between the intermediate position (FIG. 5) and the lowered position (FIG. 4), the die box 7 acts on the second leg 24 which causes the bracket 22 to pivot about the first pivot axis 31 and the first leg 23 to act on, i.e. pull on, the piston rod 44. The piston rod 44 resists movement away from the retracted position (FIGS. 5-6) due to the bias of the piston rod 44 toward the retracted position (FIGS. 5-6). Accordingly, the lift assembly 20 slows or dampens the pivoting of the bracket 22 about the first pivot axis 31 such that the dampening force relayed by the bracket 22 to the second leg 24 applies the dampening force to the die box 7. The dampening force is continuously applied to the die box 7 via the second leg 24 as the piston rod 44 moves from the retracted position (FIGS. 5-6) to the extended position (FIG. 4).

During manual pivoting of the die box 7 (as described above), components of the lift assembly 20 move and change orientation relative to the web transport conveyor 8 and the die box 7. For instance, the second leg 24 is parallel to the web transport conveyor 8 when the die box 7 is in the lowered position (FIG. 4), and when the die box 7 is in the raised position (FIG. 6), the second leg 24 and the web transport conveyor 8 form a first angle G that is smaller than a second angle H formed by the die box 7 and the web transport conveyor 8.

In another example, the piston rod 44 and the web transport conveyor 8 form a first acute angle I that decreases as the die box 7 is pivoted from the lowered position (FIG. 4, see angle I) to the raised position (FIG. 6, see angle I'). The first leg 23 and the piston rod 44 form an angle J that is a second acute angle when the die box 7 is in the lowered position (FIG. 4, see angle J) and a first obtuse angle when the die box 7 is in the raised position (FIG. 6, see angle J).

It will also be recognized that the concepts of the present disclosure are applicable to a wide variety of configurations. That is, the concepts of the present disclosure are not limited to the particular example shown in the drawings. For instance, a die box(es) can be positioned at the forming station 3 to form the food product package in the lower web and/or the cutting station to cut the upper and lower webs into separate food product packages. Accordingly, the concepts of the present disclosure are applicable to the die box(es) at these stations for moving these die box(es). Furthermore, the types, shapes, and sizes of the components of the lift assembly can vary (e.g. the bracket need not be "L"-shaped, the lift device need not be a cylinder and piston rod device), and the components of the lift assembly can be orientated relative to each other, the die box, and the web transport conveyor in any suitable orientation.

The present disclosure thus provides lifting assemblies for assisting movement of die boxes on web packaging machines. The web packaging machine is for forming a food product package from a lower web of packaging material and an upper web of packaging material. The web packaging machine includes a frame, a web transport conveyor configured to transport the lower web of packaging material along the frame, and a die box pivotally coupled to the frame and configured to form or close the food product package. A lift assembly is pivotally coupled to the frame and configured to assist manual pivoting of the die box relative to the frame. The die box is configured to be pivoted into and between a lowered position in which the die box extends parallel to the web transport conveyor and a raised position in which the die box extends transverse to the web transport conveyor. The lift assembly is further configured to apply a lifting force to the die box to thereby assist manual pivoting of the die box when the die box is manually pivoted from the lowered position to the raised position, and the lift assembly is further configured to apply a dampening force to the die box to thereby assist manual pivoting of the die box when the die box is manually pivoted from the raised position to the lowered position.

The lift assembly includes a lift device that actuates the lift assembly upon manual pivoting of the die box, and the lift device has a cylinder and a piston rod that reciprocates in the cylinder. The piston rod reciprocates into and between a retracted position in which the piston rod is retracted into the cylinder and an extended position in which the piston rod is extended from the cylinder. In operation, the piston rod is moved from the extended position to the retracted position as the die box is manually pivoted from the lowered position to the raised position and the piston rod is moved from the retracted position to the extended position as the die box is manually pivoted from the raised position to the lowered position. The piston rod is biased towards the retracted position by a pressurized gas contained in the cylinder.

The lift assembly includes a bracket pivotally coupled to the frame. The bracket has a first leg that is coupled to the piston rod and an opposite, second leg that supports the die box as it is moved into and out of the lowered position. The first leg is transverse to the second leg. The die box and the bracket each pivot about a single pivot axis, and the die box is spaced apart from the second leg when the die box is in the raised position. The die box is configured to remain in the raised position until the die box is manually pivoted toward the lowered position. Manual pivoting the die box from the lowered position to the raised position causes the die box to separate from the second leg at an intermediate position that is between the raised position and the lowered position, and manual pivoting the die box from the raised position to the lowered position causes the second leg to support the die box between the intermediate position and the lowered position.

The lift assembly applies the lifting force to the die box as the die box is moved from the lowered position to the raised position between the lowered position and the intermediate position, and the lift assembly applies the dampening force to the die box when the die box is moved from the raised position to the lowered position between the intermediate position and the lowered position. In certain examples, the second leg and the web transport conveyor form a first angle that is smaller than a second angle formed by the die box and the web transport conveyor when the die box is in the raised position. The second leg is parallel to the web transport conveyor when the die box is in the lowered position. In other examples, the piston rod and the web transport conveyor form a first acute angle that decreases as the die box is pivoted from the lowered position to the raised position. The first leg and the piston rod form a second acute angle when the die box is in the lowered position, and the first leg and the piston rod form an obtuse angle when the die box is in the raised position.

What is claimed is:

1. A web packaging machine for forming a food product package from a lower web of packaging material and an upper web of packaging material, the web packaging machine comprising:
   a frame;
   a web transport conveyor configured to transport the lower web of packaging material along the frame;
   a die box directly pivotally coupled to the frame at a first pivot axis and configured to form or close the food product package, the die box pivotable about the first pivot axis into and between a lowered position in which the die box extends parallel to the web transport conveyor and a raised position in which the die box extends transverse to the web transport conveyor, wherein the first pivot axis is fixed relative to the frame; and
   a lift assembly directly pivotally coupled to the frame and configured to assist manual pivoting of the die box relative to the frame, the lift assembly has a lift device that actuates the lift assembly during pivoting of the die box and a bracket pivotally coupled to the frame at the first pivot axis, wherein the bracket has a first leg coupled to the lift device and a second leg that engages the die box as the die box is pivoted, wherein the first leg is fixedly coupled to second leg, and wherein as the bracket is pivoted, the first leg and the second leg pivot about the first pivot axis; and wherein as the die box is pivoted toward the raised position, the bracket is pivoted about the first pivot axis and the die box pivots about the first pivot axis away from the second leg.

2. The web packaging machine according to claim 1, wherein the first leg is fixed relative to the second leg such that the first leg and the second leg define an angle there between that is consistent as the bracket pivots above the first pivot axis.

3. The web packaging machine according to claim 1, wherein the lift assembly is further configured to apply a lifting force to the die box to thereby assist manual pivoting of the die box when the die box is manually pivoted from the lowered position toward the raised position.

4. The web packaging machine according to claim 3, wherein the lift assembly is further configured to apply a dampening force to the die box to thereby assist manual pivoting of the die box when the die box is manually pivoted from the raised position toward the lowered position.

5. The web packaging machine according to claim 1, wherein the lift device has a cylinder and a piston rod that reciprocates in the cylinder, wherein the piston rod reciprocates into and between a retracted position in which the piston rod is retracted into the cylinder and an extended position in which the piston rod extends from the cylinder;

wherein the piston rod is moved from the extended position to the retracted position as the die box is manually pivoted from the lowered position to the raised position; and wherein the piston rod is moved from the retracted position to the extended position as the die box is manually pivoted from the raised position to the lowered position.

6. The web packaging machine according to claim 5, wherein the piston rod is biased towards the retracted position by a pressurized gas contained in the cylinder.

7. The web packaging machine according to claim 1, wherein the first leg is transverse to the second leg.

8. The web packaging machine according to claim 1, wherein the die box is spaced apart from the second leg when the die box is in the raised position.

9. The web packaging machine according to claim 1, wherein the die box is configured to remain in the raised position until the die box is manually pivoted toward the lowered position.

10. The web packaging machine according to claim 1, wherein as the die box is pivoted from the lowered position toward the raised position the die box pivots about the first pivot axis away from the second leg at an intermediate position that is between the raised position and the lowered position; and wherein as the die box is pivoted from the raised position toward the lowered position the die box pivots about the first pivot axis toward the second leg between the raised position and the intermediate position and with the second leg between the intermediate position and the lowered position.

11. The web packaging machine according to claim 10, wherein the lift assembly applies the lifting force to the die box as the die box is moved from the lowered position toward the raised position between the lowered position and the intermediate position; and wherein the lift assembly applies the dampening force to the die box when the die box is moved from the raised position toward the lowered position between the intermediate position and the lowered position.

12. The web packaging machine according to claim 10, wherein the second leg and the web transport conveyor form a first angle that is smaller than a second angle formed by the die box and the web transport conveyor when the die box is in the raised position.

13. The web packaging machine according to claim 10, wherein the second leg is parallel to the web transport conveyor when the die box is in the lowered position.

14. A web packaging machine for forming a food product package from a lower web of packaging material and an upper web of packaging material, the web packaging machine comprising:

a frame;

a web transport conveyor configured to transport the lower web of packaging material along the frame;

a die box pivotally coupled to the frame and configured to form or close the food product package, wherein the die box is further configured to be pivoted into and between a lowered position in which the die box extends parallel to the web transport conveyor and a raised position in which the die box extends transverse to the web transport conveyor;

a lift assembly pivotally coupled to the frame and configured to assist manual pivoting of the die box relative to the frame, the lift assembly has a lift device that actuates the lift assembly upon manual pivoting of the die box and a bracket pivotally coupled to the frame, wherein the bracket has a first leg that is coupled to the piston rod and an opposite, second leg that supports the die box as it is moved into and out of the lowered position;

wherein manual pivoting the die box from the lowered position toward the raised position causes the die box to separate from the second leg at an intermediate position that is between the raised position and the lowered position; and wherein manual pivoting the die box from the raised position toward the lowered position causes the second leg to support the die box between the intermediate position and the lowered position; wherein the lift assembly is configured to apply a lifting force to the die box to thereby assist manual pivoting of the die box when the die box is manually pivoted from the lowered position toward the raised position;

wherein the lift assembly is configured to apply a dampening force to the die box to thereby assist manual pivoting of the die box when the die box is manually pivoted from the raised position toward the lowered position;

wherein the lift device has a cylinder and a piston rod that reciprocates in the cylinder, wherein the piston rod reciprocates into and between a retracted position in which the piston rod is retracted into the cylinder and an extended position in which the piston rod extends from the cylinder;

wherein the piston rod is moved from the extended position to the retracted position as the die box is manually pivoted from the lowered position toward the raised position;

wherein the piston rod is moved from the retracted position to the extended position as the die box is manually pivoted from the raised position toward the lowered position; and wherein the piston rod and the web transport conveyor form an acute angle, and wherein the acute angle decreases as the die box is pivoted from the lowered position toward the raised position.

15. The web packaging machine according to claim 10, wherein the first leg and the piston rod form an acute angle when the die box is in the lowered position, and wherein the first leg and the piston rod form an obtuse angle when the die box is in the raised position.

16. A web packaging machine for forming a food product package from a lower web of packaging material and an upper web of packaging material, the web packaging machine comprising:
   a frame;
   a web transport conveyor configured to transport the lower web of packaging material along the frame;
   a die box directly pivotally coupled to the frame at a first pivot axis that is fixed relative to the frame, wherein the die box is pivoted about the first pivot axis into and between:
      a lowered position in which the die box extends parallel to the web transport conveyor, wherein in the lowered position, the die box is configured to form the food product package; and
      a raised position in which the die box extends transverse to the web transport conveyor;
   a bracket that is directly pivotally coupled to the frame at the first pivot axis, wherein as the bracket is pivoted, a first leg and a second leg of the bracket pivot about the first pivot axis, wherein the first leg is fixedly coupled to the second leg; and
   a lift device coupled the first leg;
   wherein when the die box is pivoted from the lowered position to the raised position, the lift device pivots the bracket about the first pivot axis such that the second leg applies a force to the die box to assist movement of the die box toward the raised position; and
   wherein when the die box is pivoted from the raised position to the lowered position, the lift device slows pivoting of the bracket about the first pivot axis such that the second leg slows movement of the die box toward the lowered position.

17. The web packaging machine according to claim 16, wherein as the die box is pivoted from the lowered position toward the raised position, the die box is pivoted through an intermediate position between the lowered position and the raised position; and
   wherein as the die box is pivoted from the intermediate position to the raised position, the die box is pivoted about the first pivot axis away from the second leg.

* * * * *